United States Patent
Ziech

(10) Patent No.: US 10,571,007 B2
(45) Date of Patent: Feb. 25, 2020

(54) LIMITED SLIP DIFFERENTIAL WITH DISCONNECT FUNCTION

(71) Applicant: DANA HEAVY VEHICLE SYSTEMS GROUP, LLC, Maumee, OH (US)

(72) Inventor: James F. Ziech, Kalamazoo, MI (US)

(73) Assignee: Dana Heavy Vehicle Systems Group, LLC, Maumee, OH (US)

( * ) Notice: Subject to any disclaimer, the term of this patent is extended or adjusted under 35 U.S.C. 154(b) by 385 days.

(21) Appl. No.: 15/321,057

(22) PCT Filed: Jul. 9, 2015

(86) PCT No.: PCT/US2015/039709
§ 371 (c)(1),
(2) Date: Dec. 21, 2016

(87) PCT Pub. No.: WO2016/007724
PCT Pub. Date: Jan. 14, 2016

(65) Prior Publication Data
US 2017/0198798 A1 Jul. 13, 2017

Related U.S. Application Data

(60) Provisional application No. 62/022,712, filed on Jul. 10, 2014.

(51) Int. Cl.
| | |
|---|---|
| *F16H 48/22* | (2006.01) |
| *B60K 17/346* | (2006.01) |
| *F16H 48/08* | (2006.01) |
| *F16H 48/40* | (2012.01) |
| *B60K 17/16* | (2006.01) |
| *F16H 48/24* | (2006.01) |

(Continued)

(52) U.S. Cl.
CPC ......... *F16H 48/22* (2013.01); *B60K 17/3462* (2013.01); *F16D 13/52* (2013.01); *F16D 13/70* (2013.01); *F16H 48/08* (2013.01); *F16H 48/24* (2013.01); *F16H 48/40* (2013.01); *B60K 17/20* (2013.01)

(58) Field of Classification Search
CPC ...... B60K 17/16; B60K 17/165; B60K 17/20; B60K 17/346; B60K 17/3462; F16H 48/00; F16H 48/06; F16H 48/08; F16H 48/20; F16H 48/22; F16H 48/24; F16H 48/30; F16H 48/32
See application file for complete search history.

(56) References Cited

U.S. PATENT DOCUMENTS 3,448,635 A 6/1969 Nelson
3,762,503 A 10/1973 Wilder et al.
(Continued)

FOREIGN PATENT DOCUMENTS

DE 1555290 A1 10/1970

OTHER PUBLICATIONS

International Search Report for Application No. PCT/US2015/039709, dated Feb. 17, 2016.

*Primary Examiner* — Jacob S. Scott
(74) *Attorney, Agent, or Firm* — Marshall & Melhorn, LLC

(57) ABSTRACT

A differential system provides an axle disconnect function, a synchronizer function, and it has the ability to transmit large amounts of torque and has a limited slip differential function in a compact and cost effective module.

15 Claims, 2 Drawing Sheets

(51) Int. Cl.
*F16D 13/52* (2006.01)
*F16D 13/70* (2006.01)

(56) References Cited

U.S. PATENT DOCUMENTS

| | | |
|---|---|---|
| 4,263,824 A | 4/1981 | Mueller |
| 4,526,063 A | 7/1985 | Oster |
| 4,594,913 A | 6/1986 | Opitz |
| 5,030,181 A | 7/1991 | Keller |
| 5,312,307 A | 5/1994 | Reaser |
| 8,678,971 B2 | 3/2014 | Schmidt et al. |
| 10,293,686 B2 * | 5/2019 | Osborn ............... B60K 17/3462 |
| 2003/0199359 A1 * | 10/2003 | Tucker-Peake ...... B60K 17/356 475/231 |
| 2005/0261101 A1 | 11/2005 | Yoshioka |
| 2011/0082004 A1 * | 4/2011 | Kato .................... B60K 17/344 475/303 |
| 2011/0143878 A1 * | 6/2011 | Juenemann .......... B60K 17/348 475/220 |
| 2011/0275470 A1 * | 11/2011 | Ekonen ................. B60K 17/35 475/198 |
| 2011/0319213 A1 * | 12/2011 | Ekonen ................. B60K 17/35 475/86 |

* cited by examiner

LIMITED SLIP DIFFERENTIAL WITH DISCONNECT FUNCTION

RELATED APPLICATIONS

This application claims priority to and the benefit of U.S. Provisional Application Ser. No. 62/022,712 filed Jul. 10, 2014 which is incorporated by reference in its entirety.

BACKGROUND OF THE INVENTION

Currently, 4×4 and 6×4 drivelines, which are commonly used with semi-trailer trucks, incorporate a disconnect feature. The disconnect feature may also be useful in drivelines used with light motor vehicles such as pickup trucks or sport utility vehicles. The disconnect feature allows one drive axle to be disengaged from the driveline (and thus idled) to reduce friction losses and improve fuel economy during cruise conditions. When it is desired for the disconnected drive axle to be re-engaged with the driveline, a multi-plate wet friction clutch or a transmission type synchronizer is typically used to synchronize the idling auxiliary drive axle parts with the vehicle road speed. This wet clutch or synchronizer needs to be of a large enough capacity to transmit a drive torque to the auxiliary drive axle. Accordingly, such systems require a large capacity wet clutch or, alternately, a separate dog clutch due to the high torque level at the axle shaft in the drive torque mode. Further, the auxiliary drive axle typically utilizes an open wheel differential to avoid an added cost of a limited slip differential assembly.

It would be advantageous to develop a more cost effective system that can provide an axle shaft disconnect function, synchronizer function, a limited slip differential function, and an ability to transmit large amounts of torque in a compact and cost effective unit.

SUMMARY

In one embodiment, a limited slip differential has a first side gear and a second side gear. The second side gear has a first set of axially extending teeth. The embodiment includes an axle engagement assembly comprises a housing, a clutch pack, an engagement sleeve, a thrust plate and an actuating mechanism. The clutch pack has a first set of plates connected for axial and rotational movement with the differential case housing portion, and a second set of plates connected for axial and rotational movement with the engagement sleeve. The engagement sleeve has a second set of axially extending teeth axially aligned with the first set of axially extending teeth. The engagement sleeve is in continuous engagement with at least one axle shaft.

In a second embodiment, a limited slip differential has a moveable side gear having a shaft portion and a flange portion. The shaft portion has a gear portion mounted thereon. The flange portion supports a first set of plates of a clutch pack for axial and rotational movement thereon. A differential case extension has a second set of plates of the clutch for axial and rotational movement thereon. An actuator selectively engages the clutch pack and moves the differential side gear into engagement with the differential side pinion.

DETAILED DESCRIPTION OF THE PREFERRED EMBODIMENTS

It is to be understood that the invention may assume various alternative orientations and step sequences, except where expressly specified to the contrary. It is also to be understood that the specific devices and processes illustrated in the attached drawings, and described in the following specification are simply exemplary embodiments of the inventive concepts of the present invention. Hence, specific dimensions, directions, orientations or other physical characteristics relating to the embodiments disclosed are not to be considered as limiting, unless expressly stated otherwise.

Figure 1:
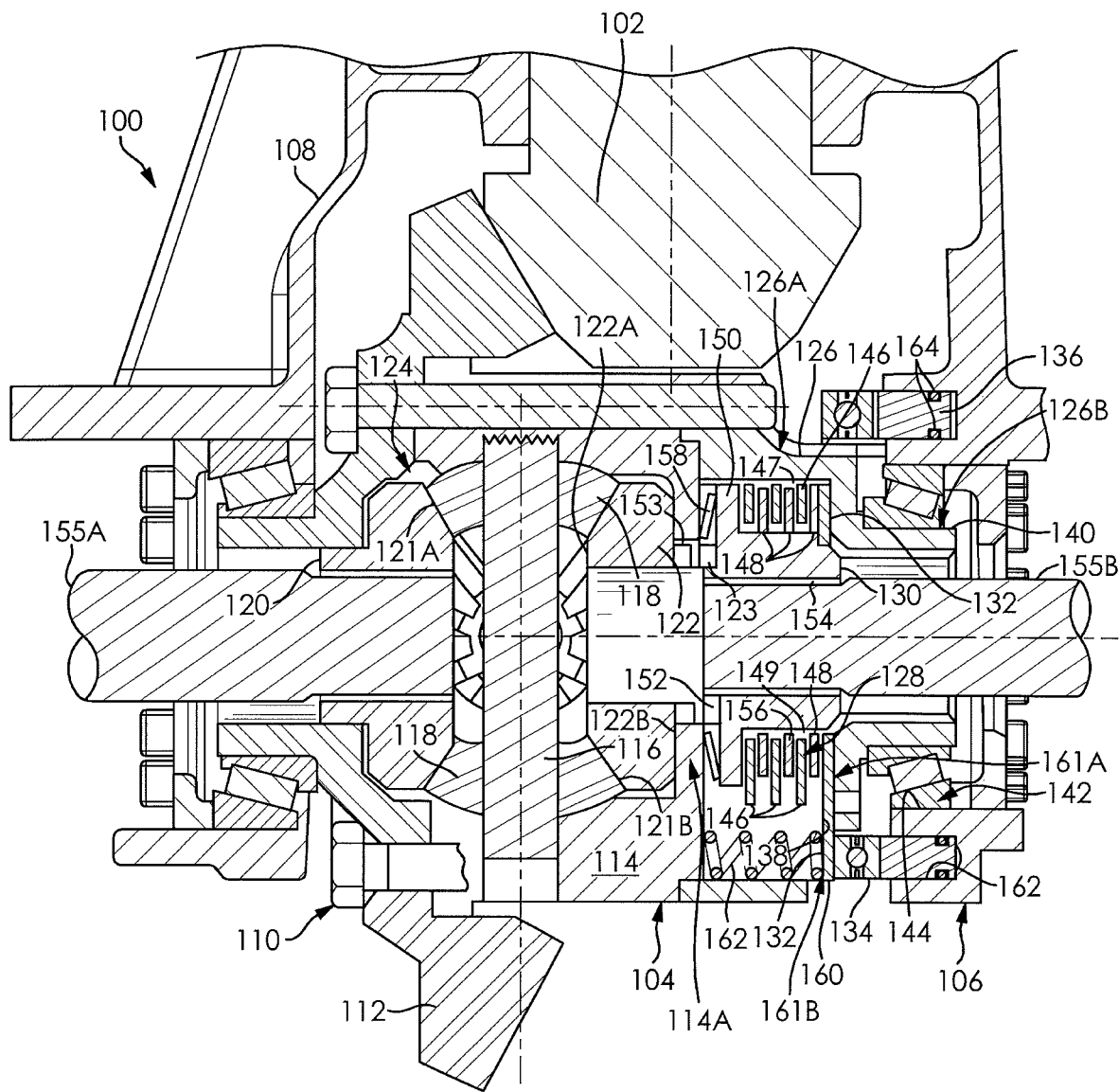
FIG. 1 is a sectional view of one embodiment of a limited slip differential according to the invention.
Figure 1A:
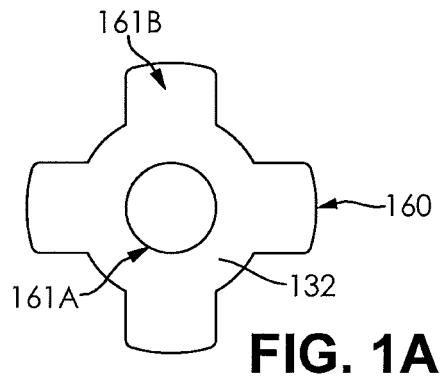
FIG. 1A is a view of one component of the differential from FIG. 1.

FIG. 1 illustrates a limited slip differential 100 according to a first embodiment of the invention. The limited slip differential 100 is in driving engagement with a drive pinion 102, a first output axle half shaft 155A, and a second output axle half shaft 155B. The limited slip differential 100 includes a differential assembly 104 and an axle engagement assembly 106. The drive pinion 102 and the limited slip differential 100 are rotatably disposed in an axle housing 108. The limited slip differential 100 facilitates at least variable driving engagement between the second output axle half shaft and a differential housing 110 of the differential assembly 104. Further, the limited slip differential 100 has a disconnect function.

The limited slip differential 100 includes a differential assembly 104 and an axle engagement assembly 106. A portion of the axle engagement assembly 106 is fixed to the differential assembly 104 for rotation therewith. The differential assembly 104 includes the differential housing 110 (which comprises a ring gear portion 112, a central portion 114, and the portion of the axle engagement assembly 106), at least one cross shaft 116, at least one spider pinion gear 118, a conventional side gear 120, and an engageable side gear 122. Side gear 120 and side gear 122 have inward facing teeth 121A, 121B that mesh with at least one of the spider pinion gears 118.

The central portion 114 is fixed to the ring gear portion 112 and the portion of the axle engagement assembly 106 to define a differential cavity 124. The at least one cross shaft 116, the at least a pair of spider pinion gears 118, the conventional side gear 120, and the engageable side gear 122 are disposed within the differential cavity 124 and engaged with one another in a conventional manner, which is known in the art.

The engageable side gear 122 has an inward facing surface 122A and an outward facing surface 122B axially opposite the inward facing surface 122A. The outward facing surface 122B has a first set of axially extending teeth 123.

The axle engagement assembly 106 includes a differential case housing portion 126, a clutch pack 128, an engagement sleeve 130, a thrust plate 132, a bearing 134, and an actuating mechanism 136. The differential case housing portion 126 is fixed to the central portion 114 of the differential housing 110 and is rotatably supported within the axle housing 108. The clutch pack 128 is disposed within the differential case housing portion 126 and is in driving engagement with the differential case housing portion 126 and the engagement sleeve 130. The actuating mechanism 136 is sealingly disposed within an annular recess formed in the axle housing 108. When placed in at least a partially engaged position, the axle engagement assembly 106 facilitates at least variable driving engagement between the housing portion 126 and the engagement sleeve 130 and the axle shaft 155B.

The differential case housing portion 126 is a substantially annular shaped member fixed to the central portion 114 of the differential housing 110. The differential case housing portion 126 is rotatably supported within the axle housing 108. A plurality of apertures 138 formed through the housing portion 126 allow a portion of the thrust plate 132 to extend therefrom in a radial manner. The apertures 138 facilitate an axial displacement of the thrust plate 132 in response to a force applied thereto by the actuating mechanism 136 through the bearing 134.

The differential case housing portion 126 has a differential case clutch pack portion 126A and a reduced diameter portion 126B. The reduced diameter portion 126B is axially adjacent the differential case clutch pack portion 126A. The actuating mechanism 136 is located radially outward from the reduced diameter portion 126B.

A seat portion 140 of the differential case housing portion 126 has a reduced diameter, onto which an inner race of a bearing 142 is disposed. The outer race of the bearing 142 is disposed in a mounting recess 144 formed in the axle housing 108.

The clutch pack 128 comprises a first plurality of plates 146 and a second plurality of plates 148. The first plurality of plates 146 is drivingly engaged with the differential case housing portion 126 through a plurality of slots 147 formed on an inner surface of the differential case housing portion 126. The slots 147 facilitate axial and rotational movement of the plates 146 on the differential case housing portion 126. Each of the plates 146 is a clutch plate as is known in the art. As shown, the first plurality of plates 146 includes three plates, however, it is understood that any number of plates may form the first plurality of plates 146.

The second plurality of plates 148 is drivingly engaged with the engagement sleeve 130 through a plurality of splines 149 formed on an outer surface of the engagement sleeve 130. The splines 149 facilitate axial and rotational movement of the plates 148 on the housing portion 126. Each of the plates 148 is a clutch plate as is known in the art. As shown, the second plurality of plates 148 includes three plates, however, it is understood that any number of plates may form the second plurality of plates 148. The first plurality of plates 146 interleaved with the second plurality of plates 148 forms the clutch pack 128. It is understood that a plurality of biasing members (not shown) may also be interleaved between the first plurality of plates 146 and the second plurality of plates 148 to ensure the plates 146, 148 are spaced apart in a substantially equidistant manner and to militate against losses caused by unnecessary contact between the plates 146, 148 when the clutch pack 128 is uncompressed.

The engagement sleeve 130 is a hollow, annular flanged member disposed in the differential case housing portion 126. The engagement sleeve 130 includes a flanged portion 150, an engagement portion 152, a splined inner surface 154, and a splined outer surface 156. The flanged portion 150 extends in a radial manner from an end of the outer surface 156 and abuts the clutch pack 128 on a first side and a conical spring washer 158. The conical spring washer 158 is a biasing member disposed between a radially inward extending wall 114 of the central portion 114 and the flanged portion 150 to urge the engagement sleeve 130 away from the differential assembly 104, causing the engagement sleeve 130 to be drivingly disengaged from the engageable side gear 122. The radially extending wall 114A is located between the biasing member 158 and the side gear 122. The teeth 123 of the side gear 122 are located radially inward from the radially extending wall 114A.

The engagement portion 152 comprises a second set of axially extending teeth 153 aligned with the first set of axially extending teeth, also known as the engagement portion 152. When the axle engagement assembly 106 is in a fully engaged position, the engagement portion 152 is drivingly engaged with the engageable side gear 122. The splined inner surface 154 is an inner surface of the engagement sleeve 130 which comprises a plurality of splines corresponding to a plurality of splines formed on the second output axle half shaft 155B. The plurality of splines of the second output axle half shaft is drivingly engaged with the splined inner surface 154 of the engagement sleeve 130 to afford driving engagement therebetween. The engagement sleeve 130 is therefore in continuous engagement with the second output axle half shaft 155B.

The splined outer surface 156 is an outer surface of the engagement sleeve 130 which comprises a plurality of splines corresponding to a portion of the second plurality of plates 148 of the clutch pack 128. The second plurality of plates 148 is drivingly engaged with the splined outer surface 156 of the engagement sleeve 130 to afford driving engagement therebetween.

The thrust plate 132 is a substantially ring shaped member disposed about the engagement sleeve 130 and disposed against the clutch pack 128. The thrust plate 132 includes a plurality of tabs 160 radially extending from a remaining portion. When the axle engagement assembly 106 is assembled, the thrust plate 132 is disposed therein and the tabs 160 extend through the apertures 138 formed through the differential case housing portion 126 and contact a portion of the bearing 134. In response to a force applied thereto by the actuating mechanism 136 through the bearing 134 to the thrust plate 132, a force is applied to the clutch pack 128.

More particularly, the thrust plate 132 has a radially inward portion 161A in contact with the clutch pack 128. The thrust plate 132 also has a radially outward portion 161B in contact with the actuating mechanism 136 and the differential case 126 slots 147. The thrust plate 132 has a plurality of tabs 160 to facilitate axial and rotational movement of the thrust plate 132 with the differential case 126.

The bearing 134 as shown is a ball thrust bearing; however, it is understood that other types of bearings may be used with the axle engagement assembly 106. A first portion of the bearing 134 is disposed against the plurality of tabs 160 of the thrust plate 132 and a second portion of the bearings is disposed against the actuating piston 136.

The actuating mechanism 136 may be a piston, such as a fluid operated piston. The actuating mechanism may be 136, an electromagnetic solenoid, or a ball ramp and thrust plate.

The piston 136 is a substantially ring shaped member sealingly disposed in an annular recess 162 in the axle housing 108. The actuating piston 136 is mounted radially outside the axle housing 108. The actuating piston 136 includes a pair of annular recesses into which a pair of O-rings 164 is disposed. The O-rings 164 facilitate sealing engagement between the actuating piston 136 and the annular recess 162. The actuating piston 136 may be axially displaced, towards the differential assembly 104, in response to application of a pressurized fluid to the annular recess 162 of the axle housing 108. In response to axial displacement of the actuating piston 136, a force is applied to the clutch pack 128 and to the engagement sleeve 130, through the bearing 134 and the thrust plate 132. Further, it is understood that the axle engagement assembly 106 could incorporate a ball and ramp style actuator, an electromagnetic actuator, or any combination of actuators.

Figure 2:
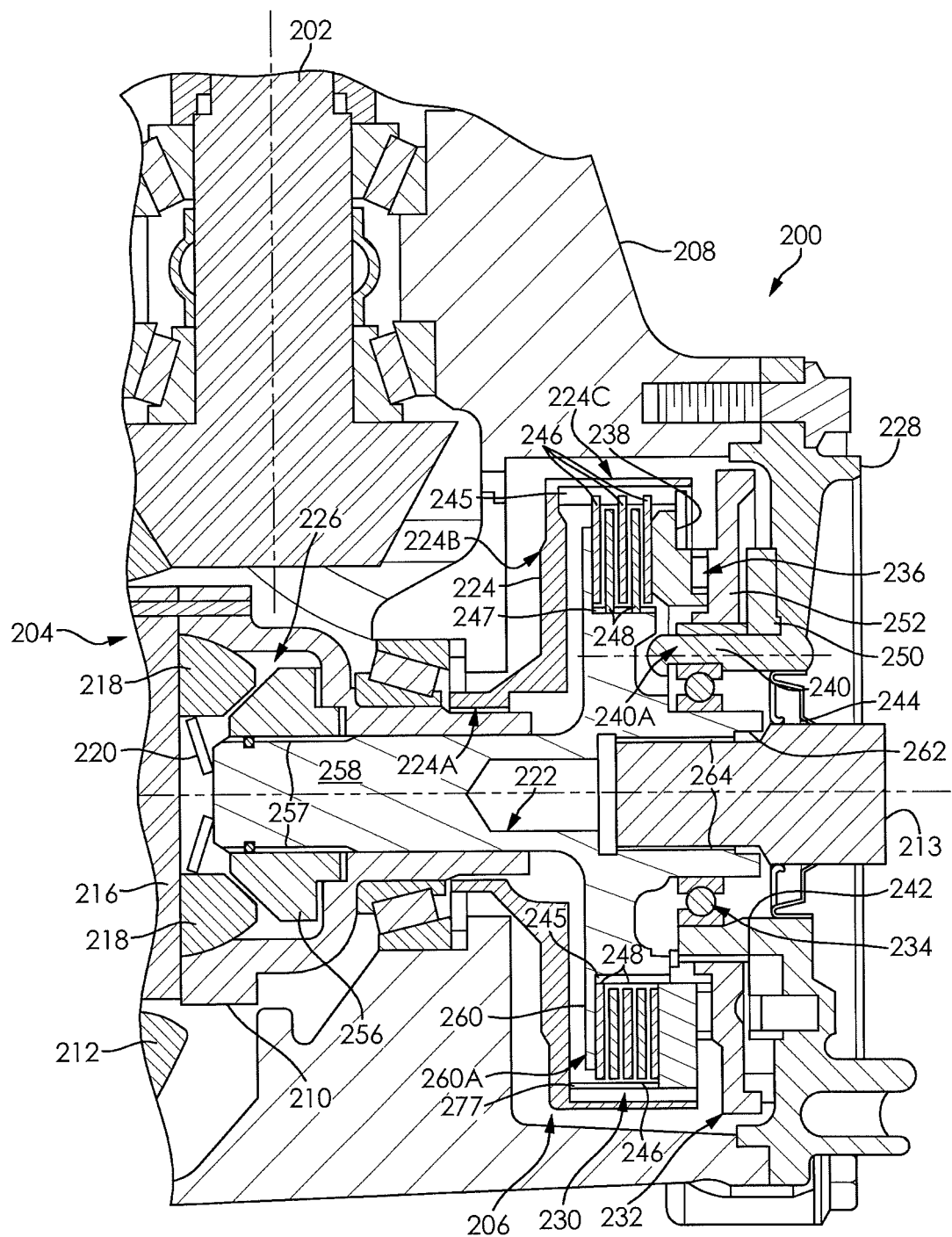
FIG. 2 is a sectional view of another embodiment of a limited slip differential according to the invention.

FIG. 2 illustrates a limited slip differential 200 according to a second embodiment of the invention. The limited slip differential 200 is in driving engagement with a drive pinion 202 and ring gear 212, a first output axle half shaft (not shown), and a second output axle half shaft 213. The limited slip differential 200 includes a differential assembly 204 and an axle engagement assembly 206. The drive pinion 202 and the limited slip differential 200 are rotatably disposed in an axle housing 208. The limited slip differential 200 facilitates at least variable driving engagement between the second output axle half shaft 213 and a differential housing 210 of the differential assembly 204. Further, the limited slip differential 200 has a disconnect function.

A portion of the axle engagement assembly 206 is fixed to the differential assembly 204 for rotation therewith. The differential assembly 204 includes the differential case 210, a ring gear portion 212 (partially shown), the portion of the axle engagement assembly 206, at least one cross shaft 216, at least one spider pinion gear 218, a conventional side gear (not shown), a side gear biasing member 220, a moveable side gear shaft 222, a moveable side gear 256, and a differential case extension 224.

The differential case 210 is fixed to the ring gear portion 212 to define a differential cavity 226. The side gear 256 is located within the differential case 210. The portion of the axle engagement assembly 106 is drivingly engaged with the differential case 210. The at least one cross shaft 216, the at least one spider gear 218, and the conventional side gear are disposed within the differential cavity 226 and engaged with one another in a conventional manner, which is known in the art. The moveable side gear 256 is disposed within the differential cavity 226 and may be selectively drivingly engaged with the spider gear 218.

The differential case extension 224 is disposed adjacent the differential case 210 and is drivingly engaged therewith. The differential case extension 224 is a hollow annular member which partially encloses at least a portion of the axle engagement assembly 206.

The differential case extension 224 has a first axial portion 224A. A first radial portion 224B is connected to the first axial portion 224A. The first radial portion 224B is radially parallel a flange portion 260. A second axial portion 224C is connected to the first radial portion 224B. The second axial portion radially encloses the flange portion 260 and at least a portion of a thrust plate 238.

The axle engagement assembly 206 includes a cover portion 228, a clutch pack 230, a ball and ramp actuator 232, a ball bearing 234, a needle thrust bearing 236, and the thrust plate 238. The cover portion 228 is fixed to the axle housing 208 and supports the ball and ramp actuator 232 and the ball bearing 234. The clutch pack 230 is disposed within the differential case extension 224 and is in driving engagement with the differential case extension 224 and the moveable side gear 256. The ball and ramp actuator 232 is disposed against the needle thrust bearing 236 and is in driving engagement with a ball and ramp actuator (not shown). The ball bearing 234 is disposed within the cover portion 228 and rotatably and slidably supports the moveable side gear shaft 222. The needle thrust bearing 236 is disposed between and in rolling contact with a portion of the ball and ramp actuator 232 and the thrust plate 238. The thrust plate 238 is in driving engagement with the differential case extension 224; however, the thrust plate 238 is axially slidable within the differential case extension 224. When placed in at least a partially engaged position, the axle engagement assembly 206 facilitates at least variable driving engagement between the differential case extension 224 of the differential case 210 and the moveable side gear shaft 222.

While a ball and ramp actuator is disclosed, a fluid piston or an electromagnetic solenoid may also be used.

The cover portion 228 is a substantially annular shaped member fixed to and sealingly engaged with a distal end of the axle housing 208. The cover portion 228 may be fixed to the axle housing 208 with a plurality of threaded fasteners; however, it is understood that the cover portion 228 may be fixed thereto in any conventional manner. An annular protuberance 240 extends from the cover portion 228 into the differential cavity 226 and defines a perforation 242 through the cover portion 228. A second output axle seal 244 is disposed in the perforation for sealingly engaging the second output axle half shaft 213. A portion of the ball and ramp actuator 232 is non-rotatably disposed on an outer surface of the annular protuberance 240. A portion of the ball bearing 234 is non-rotatably disposed on an inner surface of the annular protuberance 240. The cover portion 228 may be configured to receive the ball and ramp actuator (not shown) or may be configured to allow the ball and ramp actuator to be mounted to an outer surface thereof.

The clutch pack 230 comprises a first plurality of plates 246 and a second plurality of plates 248. The first plurality of plates 246 is drivingly engaged with the differential case extension 224 through a plurality of splines 245 formed on an inner surface of the differential case extension 224. The splines 245 permit axial movement of the plates 246. Each of the plates 246 is a clutch plate as is known in the art. As shown, the first plurality of plates 246 includes three plates, however, it is understood that any number of plates may form the first plurality of plates 246. The second plurality of plates 248 is drivingly engaged with the moveable side gear shaft 222 through a plurality of splines 247 formed on an outer surface of the moveable side gear shaft 222. Each of the plates 248 is a clutch plate as is known in the art. As shown, the second plurality of plates 248 includes three plates, however, it is understood that any number of plates may form the second plurality of plates 248. The first plurality of plates 246 interleaved with the second plurality of plates 248 forms the clutch pack 230. It is understood that a plurality of biasing members (not shown) may also be interleaved between the first plurality of plates 246 and the second plurality of plates 248 to ensure the plates 246, 248 are spaced apart in a substantially equidistant manner and to militate against losses caused by unnecessary contact between the plates 246, 248 when the clutch pack 230 is uncompressed.

The ball and ramp actuator 232 comprises a first plate 250, a second plate 252, and a plurality of actuation elements (not shown). The ball and ramp actuator 232 is known in the art; however, it is understood that other types of actuators may be used. When the first plate 250 and the second plate 252 are rotated with respect to one another, the first plate 250 and the second plate 252 become spaced apart and are used to apply a linear force to the clutch pack 230 through the needle thrust bearing 236 and the thrust plate 238. The ball ramp actuator 232 is located axially adjacent the clutch pack 230. The actuator 232 is mounted on the annular protuberance 240, which as an axially extending portion 240A. The actuator 232 is also located axially between the cover 206 and the thrust plate 238. It is understood that the axle engagement assembly 206 could incorporate a fluid piston style actuator, an electromagnetic actuator, or any combination of actuators.

The first plate 250 is a disk shaped member having a plurality of arc-shaped ramps formed therein and oriented to face the second plate 252. A depth of each of the arc-shaped ramps varies along a length of each of the arc-shaped ramps. A quantity of the ramps corresponds to a number of actuation elements (not shown). The first plate 250 is coupled to the annular protuberance 240 of the cover portion 228.

The second plate 252 is a disk shaped member having a plurality of arc-shaped ramps formed therein and oriented to face the first plate 250. A depth of each of the arc-shaped ramps varies along a length of each of the arc-shaped ramps. A quantity of the ramps corresponds to a number of actuation elements (not shown). The second plate 252 is in driving engagement with the ball and ramp actuator (not shown) to rotate the second plate 252 about the annular protuberance 240 of the cover portion 228. The second plate 252 is disposed against the needle thrust bearing 236.

The actuation elements (not shown) are ball bearings rotatably disposed in the arc-shaped ramps formed in the first plate 250 and the second plate 252. Alternately, it is understood that the actuation elements may have other shapes. When the first plate 250 and the second plate 252 are rotated with respect to one another, the actuation elements roll within the arc-shaped ramps formed in the first plate 250 and the second plate 252, which cause the first plate 250 and the second plate 252 to become spaced apart based on a depth of the arc-shaped ramps.

The needle thrust bearing 236 is disposed between and in rolling contact with the second plate 252 of the ball and ramp actuator 232 and the thrust plate 238. The needle thrust bearing 236 comprises a plurality of rollers radially arranged in a cage and is well known in the art. A force generated by the ball and ramp actuator 232 is applied to the clutch pack 230 through the needle thrust bearing 236 and the thrust plate 238. The needle thrust bearing 236 facilitates relative rotation between the second plate 252 of the ball and ramp actuator 232 and the thrust plate 238 while linear force is applied therebetween.

The thrust plate 238 is a substantially ring shaped member disposed between the needle thrust bearing 236 and the clutch 230. The thrust plate 238 is in driving engagement with the differential case extension 224 through a plurality of splines (not shown) formed on an inner surface of the differential case extension 224. The thrust plate 238 is axially slidable along the plurality of splines within the differential case extension 224. In response to a force applied thereto by the ball and ramp actuator 232 through the bearing needle thrust bearing 236 to the thrust plate 238, a force is applied to the clutch pack 230. Thus, the thrust plate 238 is located between the clutch pack 230 and the ball ramp actuator 232. The thrust plate 238 is also located radially outboard from the protuberance 240 and the output axle engagement portion 222.

The ball bearing 234 radially supports the moveable side gear shaft 222 within the annular protuberance 240 while permitting the moveable side gear shaft 222 to move axially, allowing the moveable side gear shaft 222 to drivingly engage and disengage the spider pinion gears 218 and side gear 256 through the side gear 256. A first portion of the ball bearing 234 is fixed within the annular protuberance and a second portion of the ball bearing 234 is disposed on an outer surface of the moveable side gear shaft 222. A plurality of spherical elements may be disposed therebetween to facilitate axial movement between the moveable side gear shaft 222 and the cover portion 228.

The moveable side gear shaft 222 is an elongate, annular flanged member disposed in the differential cavity 226. The moveable side gear shaft 222 may be drivingly engaged with the spider gears 218 and may be at least variably drivingly engaged with the differential case extension 224 through the clutch pack 230. The moveable side gear shaft 222 includes a splined portion 257, a shaft portion 258, the flanged portion 260 extending radially from the shaft portion 258, and an output axle engagement portion 262. The splined portion 257 comprises axially extending splines located circumferentially about the shaft 222.

The shaft portion 258 is substantially cylindrical in shape and connects the splined portion 257 with the flanged portion 260 and the output axle engagement portion 262. As shown, the shaft portion 258 is partially hollow, but it is understood that the central portion 258 may have another type of construction.

The flanged portion 260 is a stepped portion of the moveable side gear shaft 222 that extends in a radial manner from the shaft portion 258. The second plurality of plates 248 is drivingly engaged with the flanged portion 260 through a plurality of splines 261 formed on an outer surface of the flanged portion 260. The splines 261 permit axial movement of the plates 248. A portion of the flanged portion 260 extends further radially than a remaining portion to support the clutch pack 230 when the axle engagement assembly 206 is at least variably engaged. Preferably, the portion 260A of the flanged portion 260 is an axial stop for the plates 248. At least a portion of the shaft portion 258 is housed within the differential case 210.

The output axle engagement portion 262 is a substantially hollow and cylindrical in shape and facilitates driving engagement between the moveable side gear shaft 222 and the second output axle half shaft 213. At least a portion of the output engagement portion is located radially inward from the clutch pack 230. The output axle engagement portion is therefore in continuous engagement with the second output axle half shaft 213.

The moveable side gear shaft 222 is drivingly and slidably engaged with the second output axle haft shaft 213 through a plurality of splines 264 formed on an inner surface of the output axle engagement portion 262. The moveable side gear shaft 222 is biased into a position disengaged from the spider gears 218 by the side gear biasing member 220, which is a conical spring washer. The side gear biasing member 220 is disposed between the spider gears 218 and the shaft portion 258. In response to a degree of actuation of the ball and ramp actuator 232, a force applied by the side gear biasing member 220 may be overcome, compressing the side gear biasing member 220 and engaging the geared portion 256 of the moveable side gear shaft 222 with the spider gears.

In use, the limited slip differential 100, 200 facilitates at least variable driving engagement between the second output axle half shaft 213 and one of the housing portion 126 and the differential case extension 224. Further, the limited slip differential 100, 200 has a disconnect function, which drivingly disengages the second output axle 213, 155B from the differential assembly 104, 204.

The axle engagement assembly 106, 206 of the limited slip differential 100, 200 utilizes a single shift mechanism to control a degree of engagement of the clutch pack 128, 230 and an engagement of the engagement sleeve 130 with the engageable side gear 122 or an engagement of the moveable side gear 256 with the spider gears 218. Such control allows the axle engagement assembly 106, 206 to be used for both a synchronizer function and a limited slip differential function, which engagement of the engagement sleeve 130 with the engageable side gear 122 or an engagement of the moveable side gear 256 with the spider gears 218 (the dog clutch function) acts to transmit torque from the differential assembly 104, 204 to the second output axle half shaft 213.

Accordingly, the axle engagement assembly 106, 206 provides three modes of operation: disconnection of the first and second output axle half shafts for use during a cruising mode of the vehicle, a synchronizer function to accelerate the disengage differential and/or the components of the first and second output axle half shafts to a speed of the vehicle, and a traction mode to engage the first and second output axle half shafts to transmit wheel slip torques while at the same time applying a bias torque via the clutch pack to the differential assembly 104, 204 to enhance a tractive effort for all road conditions. Since the limited slip differential function is coupled to the dog clutch function, the limited slip differential function is always engaged when the first and second output axles are engaged, thus providing added tractive effort in the 4×4 or 6×4 mode of operation. The limited slip differential function therefore is aligned with a desire to provide the most available tractive effort regardless of the side to side wheel traction conditions. Consequently, the limited slip differential 100, 200 is provided for improved fuel efficiency during cruise conditions when the axle is disconnected from the driveline and added traction during vehicle launching and acceleration when the axle is connected to the driveline and the limited slip differential function is available.

The axle engagement assembly 106, 206 may be placed in three positions: a retracted position, a partially advanced position, and a fully advanced position. When placed in the retracted position, the axle engagement assembly 106, 206 provides an open engaged mode of operation. The open engaged mode of operation disengages the second output axle from the differential assembly 104, 204. The dog clutch does not transmit torque in the retracted position but it does transmit torque in the fully advanced position.

When placed in the partially advanced position, the axle engagement assembly 106, 206 provides an energized clutch pack mode of operation. The partially advanced position engages the clutch pack 128, 230 to synchronize any idling parts to a road speed but not to engage the engagement sleeve 130 with the engageable side gear 122 or an engagement of the moveable side gear 256 with the spider gears 218.

When placed in the fully advanced position, the axle engagement assembly 106, 206 provides engagement of the second axle output shaft to the differential assembly 104, 204 while maintaining an engagement of the clutch pack 128, 230 between the second axle output shaft and the differential housing 110, 210. The fully advanced position engages both the clutch pack 128, 230 and the engagement sleeve 130 with the engageable side gear 122 or an engagement of the moveable side gear 256 with the spider gears 218. The axle engagement assembly 106 can be modulated by controlling a piston fluid pressure.

In FIG. 1, a return spring 162 is provided to retract the actuating piston 136 to the open position when the fluid pressure is reduced to zero. The conical spring washer 158 may be used to release the clutch 128 and the return spring 162 retracts the clutch 128 the rest of the way. The piston low pressure condition is sufficient to compress the return spring 162 but not the spring washer 158. The piston high pressure condition compresses the spring washer 158 to a flat condition that corresponds to full clutch engagement.

What is claimed is:

1. A method of operating a limited slip differential with modes of operation, comprising:
    a first mode of operation wherein at least one axle half shaft is disengaged from a differential;
    a second mode of operation where a clutch pack is engaged to accelerate said differential to a road speed; and
    a third mode of operation wherein said clutch pack provides a bias torque across said differential in an engaged operation mode,
    wherein a dog clutch transmits torque in the third mode of operation and does not transmit torque in the second mode of operation.

2. The method of claim 1, wherein the dog clutch comprises a differential side gear and a spider gear.

3. The method of claim 1, wherein the dog clutch comprises a differential side gear and an engagement sleeve.

4. The method of claim 1, wherein at least one differential side gear is engaged or disengaged to provide the second mode of operation or the third mode of operation.

5. The method of claim 4, wherein the at least one differential side gear is engaged to provide the third mode of operation.

6. The method of claim 5, wherein the at least one differential side gear is engaged with an engagement sleeve or a spider gear in the third mode of operation.

7. The method of claim 6, wherein the engagement sleeve moves axially to engage the at least one differential side gear.

8. The method of claim 6, wherein the at least one differential side gear moves axially to engage the spider gear.

9. The method of claim 4, wherein the at least one differential side gear is disengaged to provide the second mode of operation.

10. The method of claim 9, wherein the at least one differential side gear is disengaged from an engagement sleeve or a spider gear in the second mode of operation.

11. A method of operating a limited slip differential with modes of operation, comprising:
    a first mode of operation wherein at least one axle half shaft is disengaged from a differential;
    a second mode of operation where a clutch pack is engaged to accelerate said differential to a road speed; and
    a third mode of operation wherein said clutch pack provides a bias torque across said differential in an engaged operation mode,
    wherein engagement of an engagement sleeve and a differential side gear transmits torque in the third mode of operation and the engagement sleeve and the differential side gear are disengaged in the second mode of operation.

12. The method of claim 11, wherein the engagement sleeve moves axially to engage or disengage the differential side gear.

13. A method of operating a limited slip differential with modes of operation, comprising:
    a first mode of operation wherein at least one axle half shaft is disengaged from a differential;
    a second mode of operation where a clutch pack is engaged to accelerate said differential to a road speed; and a third mode of operation wherein said clutch pack provides a bias torque across said differential in an engaged operation mode, wherein a differential side gear or an engagement sleeve is moved axially to engage another member of the differential to transmit torque in the third mode of operation, the differential side gear or the engagement sleeve being disengaged in the second mode of operation.

14. The method of claim 13, wherein the differential side gear is engaged with a spider gear in the third mode of operation and is disengaged from the spider gear in the second mode of operation.

15. The method of claim 13, wherein the engagement sleeve is engaged with the differential side gear in the third mode of operation and is disengaged from the differential side gear in the second mode of operation.

* * * * *